3,366,244
FILTER CLOTH FITTING APPARATUS IN A
FILTER PRESS
Ken-Ichiro Kurita, 35 438 Oaza Senriyama,
Suita, Japan
Filed Dec. 30, 1965, Ser. No. 517,588
2 Claims. (Cl. 210—225)

ABSTRACT OF THE DISCLOSURE

An apparatus for fitting a filter cloth to a pair of adacent filter plates in a filter press having two pairs of links extending between plates and attached at the ends of the plates. The links being pivotally connected to each other between the plates. The filter cloth being attached to the bottoms of each plate and extending over a rod hung from springs attached to the pivotal connections, the filter cloth assuming an inverted V-shape when the plates are separated.

---

This invention relates to a filter cloth fitting apparatus in a filter press.

In a filter press of a known type each filter plate is separately provided with a filter cloth having no connection with ones in the adacent filter plates, and thus the cake accumulated thereon is rather difficult to remove even if the filter plates are moved along the machine.

The object of the present invention is to provide means for correcting this defect in a filter press.

With this object in view the present invention provides a filter cloth fitting apparatus in a filter press wherein a filter cloth is hung up on a horizontal rod just above each two adjacent filter plates with the lower ends thereof fastened to the middle of or the lower parts of sides of the plates facing each other, so as to form an inverted V-shape when the adjacent plates are parted. When filter plates are successively sent along the filter press and each two adjacent plates are parted to be cleared of filter cake, the horizontal rod on which the filter cloth is set is compelled to descend. In the present invention springs are provided between the horizontal rod and the support for it, so that the filter cloth is spared an excessive tension. Besides, each filter plate is provided with a pantograph, which facilitates the descent of the horizontal rod.

According to the present invention, filter plates in a filter press can be cleared of cake much more efficiently through by this rather simple device as compared with the known type of filter press.

Other and further objects of the present invention will become apparent from the following specification and claims taken together with the accompanying drawings in which is shown the preferred embodiment of the filter cloth fitting apparatus in a filter press according to the present invention.

Figure 1:
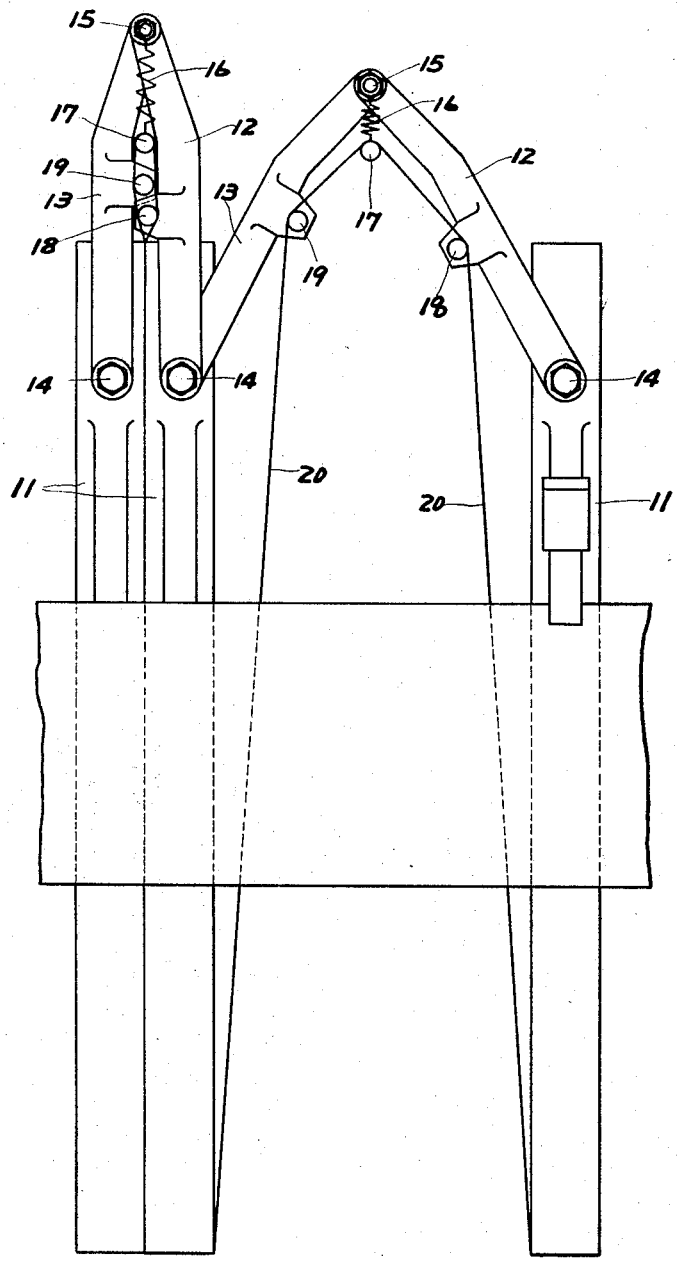
Figure 2:
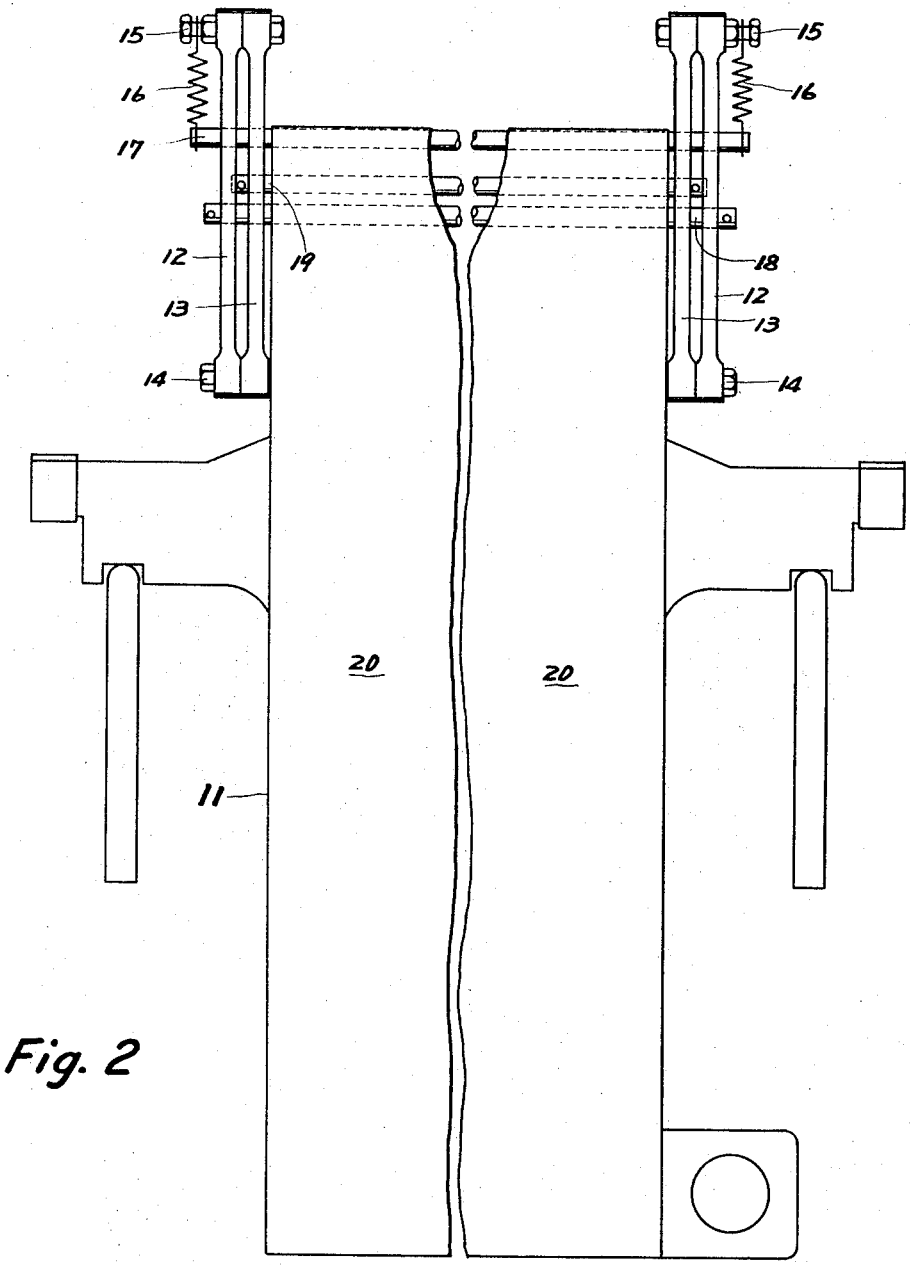

FIG. 1 is an elevation of a filter cloth fitting apparatus embodying the present invention, and FIG. 2 is a side view of the same.

In these drawings reference numeral 11 indicates filter plates in a filter press, on each shoulder of each of which are rotatably attached links 12 and 13 by means of a bolt 14. Each of the two links 12 and 13 is connected with the corresponding one on the adjacent plate on either side at the upper end thereof by a bolt 15. To each bolt 15 is attached a spring 16, and a horizontal rod 17 hangs therefrom. On the links 12 and 13 are fixed further transverse rods 18 and 19 respectively in positions such that when the links are adjacent each other the rod 19 is above the rod 18. A filter cloth 20 is hung on the horizontal rod 17 and extends over the transverse rods 18 and 19. The lower ends of the filter cloth 20, are in the drawings shown fastened to the bottom ends of the two adjacent filter plates 11.

The links 12 and 13 rotatably attached to each shoulder of the filter plates 11 and connected rotatably to each other at the upper ends thereof, permit each two adjacent filter plates 11 to be parted. With the filter cloth 20 hanging from the horizontal rod 17 above them, the filter cloth 20 moves away from the filter plates 11 when the plates 11 are separated successively along the length of the press and the cake accumulated thereon can easily drop down as compared with filter presses of the known type. Furthermore, because the horizontal rod 17 hangs from the connection point of the links 12 and 13 by the spring 16, the inevitable descent of the rod 17 caused by the parting of the filter plates 11 causes no excessive strain on the filter cloth 20, and the transverse rods 18 and 19 on the links 12 and 13 provide for the smooth descent thereof.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

What I claim is:

1. A filter cloth fitting apparatus for fitting a filter cloth to a pair of adjacent filter plates in a filter press, said apparatus comprising two pairs of links for each pair of adjacent filter plates, one pair of links being at each end of the filter plates, the links of each pair being pivotally connected at one end thereof and having the other ends pivotally attached to the respective adjacent filter plates, a spring attached to the pivotal connection of each pair of links, a horizontal rod suspended between the free ends of the springs and extending from end to end of the filter plates, a filter cloth extending over said rod and having the free ends thereof attached to the lower edges of the adjacent filter plates so that when the adjacent filter plates are separated, the filter cloth is given an inverted V-shape.

2. A filter cloth as claimed in claim 1 in which the corresponding links in each pair of links at the opposite ends of the adjacent filter plates each have a further transverse rod extending therebetween, said filter cloth extending over said further rods.

References Cited

UNITED STATES PATENTS

| 643,022 | 2/1900 | Wilson | 210—225 |
| 2,091,623 | 8/1937 | Berrigan et al. | 210—236 X |
| 2,932,399 | 4/1960 | Emele | 210—225 |
| 3,289,844 | 12/1966 | Emele | 210—225 |

FOREIGN PATENTS

| 532,720 | 11/1954 | Belgium. |
| 133,317 | 11/1901 | Sweden. |

SAMIH N. ZAHARNA, *Primary Examiner.*

REUBEN FRIEDMAN, *Examiner.*

C. DITLOW, *Assistant Examiner.*